(No Model.)  3 Sheets—Sheet 1.

C. COLAHAN.
HARVESTER.

No. 246,725.  Patented Sept. 6, 1881.

Witnesses.  Inventor.

(No Model.) 3 Sheets—Sheet 2.

C. COLAHAN.
HARVESTER.

No. 246,725. Patented Sept. 6, 1881.

Witnesses.
Henry Frankwater.
Jno. H. Whipple.

Inventor:
Chas Colahan (No Model.) 3 Sheets—Sheet 3.
C. COLAHAN.
HARVESTER.

No. 246,725. Patented Sept. 6, 1881.

Witnesses.
Henry Frankfurter
Jno. H. Whipple

Inventor.
Chas Colahan

UNITED STATES PATENT OFFICE.

CHARLES COLAHAN, OF CLEVELAND, OHIO.

HARVESTER.

SPECIFICATION forming part of Letters Patent No. 246,725, dated September 6, 1881.

Application filed November 18, 1880. (No model.)

*To all whom it may concern:*

Be it known that I, CHARLES COLAHAN, a citizen of the United States, and a resident of Cleveland, in the county of Cuyahoga and State of Ohio, have invented certain new and useful Improvements in Grain Harvesting and Binding Machines, of which the following is a specification.

The object of my invention is to increase the capacity and efficiency of the machine by bringing the reaping and delivering power of the harvester more nearly in ratio with the potential energy of the automatic binding apparatus; and it consists in combining with automatic binding apparatus reaping mechanism on both sides thereof, arranged to deliver a united stream to its action; in combining with automatic binding apparatus and reaping mechanism on both sides thereof an intermediate grain-elevator, receiving the converging streams of the reaping mechanism at its foot and uniting them for the action of the binder, and in the various other combinations hereinafter pointed out and claimed.
Heretofore in machines of this class the performance of the reaping and delivering mechanism has been largely inadequate to the possibilities of the binder, owing to the fact, long well known, that in harvesting grain the width of swath is limited by the difficulty of carrying cut grain any considerable distance on the apron, and the tendency of that which is continuously falling from the cutters to disarrange and tangle what has already been laid and is being raked. Any enlargement of the machine beyond well-recognized bounds has therefore resulted in carrying the grain to the binding apparatus in an unshapely and objectionable condition; hence the cut of the machine has been kept within the limits proven by experience to conduce best to good work by a single apron, and the binder, which is capable of very rapid action, has been slowed down or tripped to keep it in pace with the reaper.
In my invention I overcome these difficulties by limiting the carrying distance or length of the apron to what has been demonstrated as practicable, and placing one apron, with its appropriate cutting mechanism, on each side of the binding apparatus or of the elevator that delivers the grain thereto under such arrangement and relation that their streams shall be united for the action of the binder.

Figure 1:
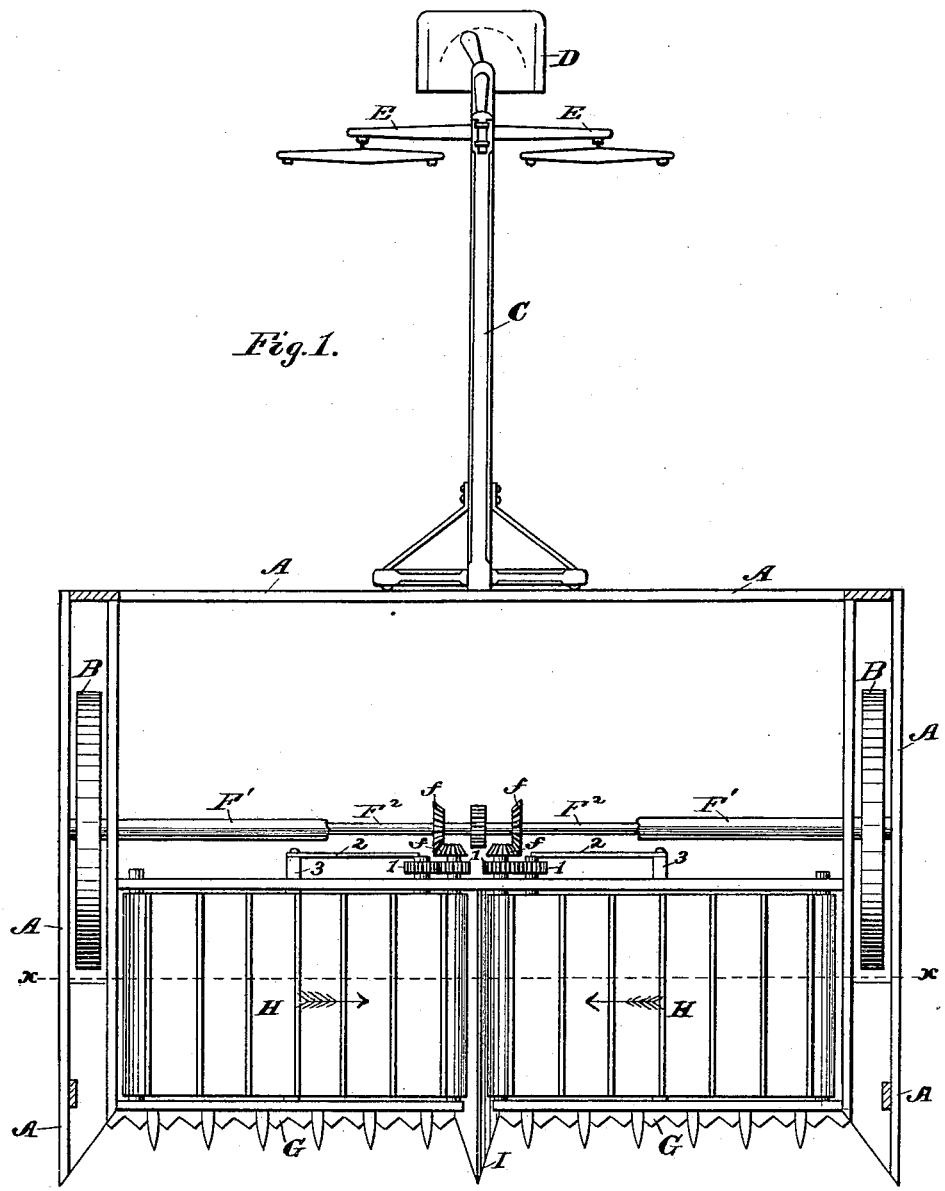
Figure 2:
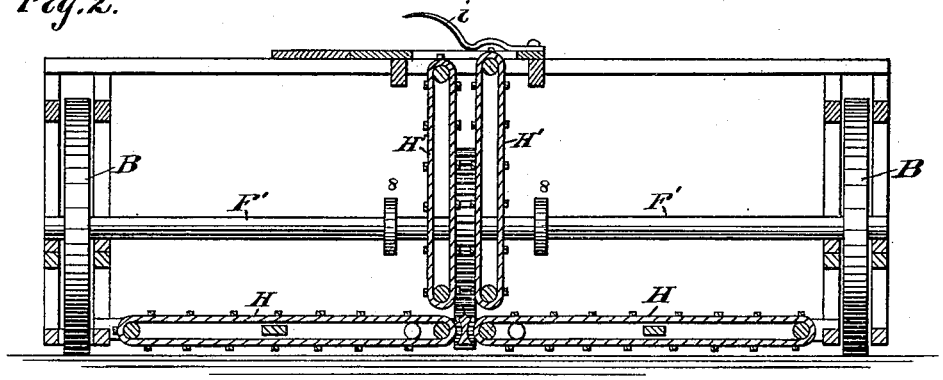
Figure 3:
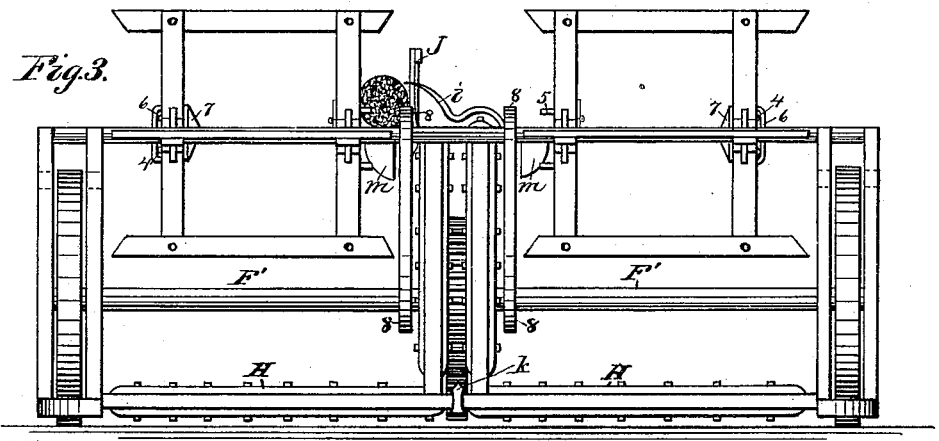
Figure 4:
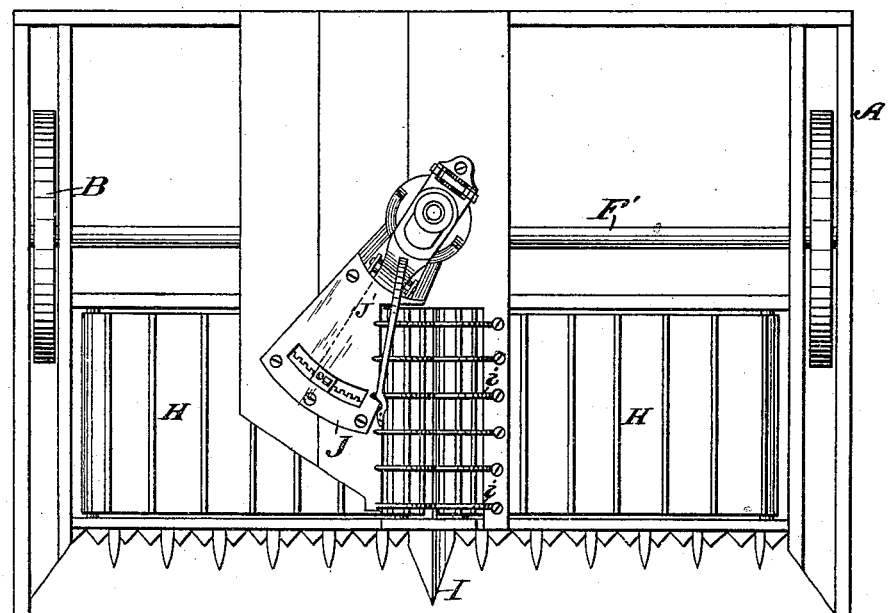
Figure 5:
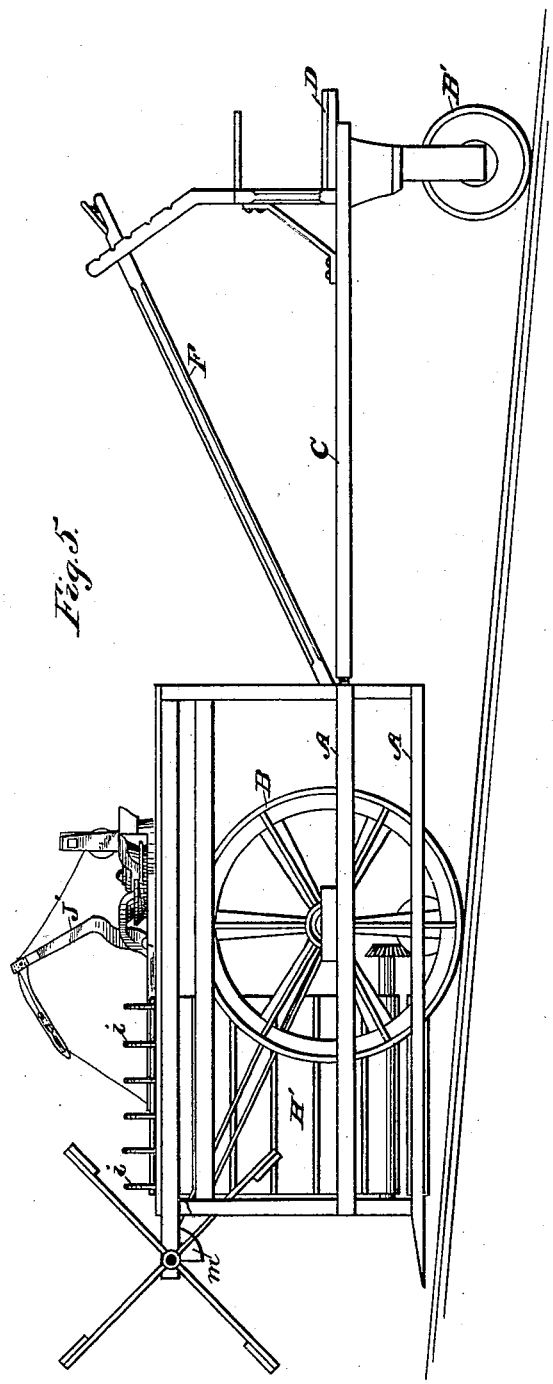

In the drawings, Figure 1 is a plan view of a harvester containing the invention, a portion of the axle being broken away. Fig. 2 is a vertical cross-section on the line $x\ x$, Fig. 1. Fig. 3 is a front elevation, the cutter-bar being omitted. Fig. 4 is a top view, showing the location of the binder and the binding-table. Fig. 5 is a side elevation.

A is the main frame of the machine, supported primarily upon two main and drive wheels, B, which are supplemented by a casterwheel, B', at the rear end of the tongue C, the front end of the latter being attached to the rear of the frame of the machine. A handle is affixed to the elongated pivot of the caster-wheel, whereby the driver, located on the seat D, may guide the machine as it is pushed or drawn along by the horses, hitched to the evener E. Another handle, F, is also within reach of the driver, whereby the frame of the machine may be tilted upon the axle F' to elevate or lower the cutter-bars G, as may be required by the condition of the field. To admit of this tilting the tongue is attached to the frame by a hinge-connection, made adjustable to further meet the exigencies of the machine.

In carrying out my invention as hereinbefore stated, I mount automatic binding apparatus at or about the center of the machine, and feed it from reaping apparatus in both directions. I prefer to divide the cut at the immediate center, as this will give a more equal draft. On each side I provide the platform, on which the cut grain falls from the cutter-bars, with two endless rakes or aprons, H, of the usual length and construction, and drive them in the direc-rections indicated by the arrows, so that they shall carry the cut grain from each end and intermediate points toward the center. A knife or cutter bar is placed in front of each apron, and a middle divider, I, separates the standing grain as the machine travels and guides it to the knives on each hand.

Over the common delivery-point of the horizontal aprons are arranged two upright elevating-aprons, H', each at such a height above the end of its corresponding platform-apron as to admit the stream of grain therefrom beneath its foot, so that the two streams may unite and be elevated in one mass between the inner faces of the upright aprons to a binding-table or grain-receptacle above and to automatic binding mechanism J', of any of the usual constructions, working in connection therewith, by which the gavels are encircled and bound.

To insure or facilitate the delivery of the grain from the horizontal to the upright aprons a guide-rib, $k$, is placed midway between the former, with its two faces curved up concentrically with the lower drums of the elevator-aprons until they meet in an edge just within the mouth or receiving end of the latter.

Deflector-wires $i\ i$ are arranged over the upright aprons or elevator, to deflect the stream of grain to the side on which the binding mechanism is located and properly guide it to the receptacle. The bound sheaves are discharged from the machine in any suitable manner.

The elevating-aprons may have substituted in their place or used in connection with them a gaveling device to gavel, or both gavel and bind, the grain in the process of elevating it and carrying it from the cutter-platform.

A shaft, $F^2$, is gudgeoned in the frame of the machine, and provided with miter-gears $f\ f$, which engage with corresponding wheels, $f'\ f'$, on the shaft of the pulleys or drums supporting the inner ends of the horizontal aprons, and these last-named shafts are provided with pinions 1 1, which mesh with corresponding pinions provided with crank-rods 2, connected with levers 3, which extend through between the upper and lower parts of the aprons and are attached to the cutter-bars. The levers 3 are pivoted about midway of their length to supports, and when vibrated by the crank-rods operate the cutting-knives in the usual way.

The upright elevator-aprons are operated, in like manner as the horizontal ones, by miter-gears (not shown) supported upon the frame of the upright aprons, and geared to the driving shaft or axle in a similar manner to miters $f'\ f'$.

The reel-beaters are attached to the reel-arms by pivotal bolts, and the reel-arms are attached to the reel-shaft by means of flexible joints 4, which allow the arms to move outward from the center when rising from the horizontal aprons. The two inner arms of the reel are provided with lugs 5, which come in contact with cams $r$, located behind the reel-shaft, in such manner as to meet the lugs and give a lateral movement to the arms on their joints during the upward movement of the beaters, so as to cause the latter as they rise to clear the binding-table above the aprons H by a longitudinal outward movement. A spring, 6, is located on the outside of the reel-arms, which forces the arms and beaters back to their normal position when released from the action of the cam in contact with lugs 5. Supports 7 are placed on the opposite sides of the reel-arms from the springs. Pulleys 8 8 on the axle F' and reel-shaft operate the reel by means of a connecting-belt.

The outward movement of the reel-arms and beaters above described is necessary only when the reel is located so far back as to bring the beaters under the binding-table in their upward movement.

I am aware that a patent has heretofore been granted for a hand binding-harvester of the type known as "thrust-cut" and of the ordinary width of swath, in which two shortened endless aprons feed to a receptacle in the center, the grain being raked therefrom by hand and delivered to attendants for binding. This construction is not intended to relatively increase the supply of grain for binding, and in nature and object otherwise differs materially from my invention.

I claim—

1. In a grain-harvester, automatic binding mechanism located at or about the longitudinal center of the sickle-platform, in combination with carrying aprons or rakes arranged to carry the cut grain from both sides toward the center, and an intermediate elevator receiving the converging streams of said aprons and delivering them in a united mass to the binding mechanism above.

2. In a grain-harvester, a grain-receptacle located at or about the longitudinal center of the sickle-platform, and automatic binding mechanism working in connection therewith, in combination with carrying aprons or rakes arranged to carry the grain independently from both sides toward the center and deliver it in a united stream to the receptacle for the action of the binding mechanism.

3. In a grain-harvester, a grain-receptacle located at or about the longitudinal center of the sickle-platform, and automatic binding mechanism working in connection therewith, in combination with horizontal carrying aprons or rakes arranged to carry the grain independently from both sides toward the center, and an intermediate elevator receiving the converging streams therefrom and elevating them in a united mass to the grain-receptacle for the action of the binding mechanism.

4. The combination, in a harvester, of two endless aprons receiving the grain as it falls from the cutters and delivering their streams in the center of the platform, and two upright elevating-aprons arranged over said delivery-point, with a space between the foot of each and the inner end of the corresponding platform-apron to admit the converging streams of grain and unite and elevate them in a common mass.

5. The combination, in a harvester, of two endless aprons receiving the grain as it falls from the cutters and delivering their streams in the center of the platform, two upright elevating-aprons arranged over said delivery-point, with a space between the foot of each and the inner end of the corresponding platform-apron to admit the converging streams and unite and elevate them in a common mass, and a grain-receptacle or binding-table at the head of the elevator to which it delivers.

6. The combination, in a harvester, of two endless aprons receiving the grain as it falls from the cutters and delivering their streams in the center of the platform, two upright elevating-aprons arranged over said delivery-point, with a space between the foot of each and the inner end of the corresponding platform-apron to admit the converging streams and unite and elevate them in a common mass, a grain-receptacle or binding-table at the head of the elevator to which it delivers, and automatic binding mechanism which takes and binds the grain delivered to said receptacle.

7. The combination, in a harvester, of two endless aprons receiving the grain from the cutters and delivering their streams in the center of the platform, two upright elevating-aprons arranged over said delivery-point with a space between the foot of each and the inner end of the corresponding platform-apron to admit the converging streams and unite and elevate them in a common mass, a grain-receptacle or binding-table at one side of the head of said elevator, and guides or deflectors which direct the stream of grain therefrom into said receptacle.

8. The combination, in a harvester, of two endless aprons receiving the grain from the cutters and delivering their streams in the center of the platform, two upright elevating-aprons arranged over said delivery-point, with a space between the foot of each and the inner end of the corresponding platform-apron to admit the converging streams and unite and elevate them in a common mass, a grain-receptacle or binding-table at one side of the head of said elevator, guides or deflectors which direct the stream of grain therefrom into said receptacle, and automatic binding mechanism which takes and binds the grain delivered to said receptacle.

9. The combination, in a harvester, of a grain-platform, two horizontal aprons located thereon to receive the falling grain and deliver it at the center, a sickle-bar in front of each apron, and a central divider in front of the common delivery-point.

10. The combination, in a harvester, of a grain-platform, automatic binding mechanism located at the center thereof, two horizontal platform-aprons delivering the grain falling thereon into a common mass at the center for the action of the binder, a sickle-bar in front of each apron, and a central divider in front of the binder, and common delivery-point to direct the standing grain to the cutting-spaces on either hand immediately in front of said aprons.

11. The combination, in a harvester, of a grain-platform, automatic binding mechanism located at the center thereof, two horizontal platform-aprons delivering the grain falling thereon to the center, an elevator intermediate between the binding mechanism and said delivery-point to elevate the converging streams thereto, a sickle-bar in front of each platform-apron, and a central divider in front of the elevator, and common delivery-point to direct the standing grain to the cutting-spaces on either hand immediately in front of said aprons.

12. The combination of the two platform-aprons delivering toward each other, the two elevator-aprons placed over the delivery-point of the platform-aprons, and the rib or guide $k$, beneath said elevator-aprons, to insure or facilitate the delivery of the converging streams of grain thereto.

13. In combination with the beaters of a harvester-reel, mechanism for moving them longitudinally as they rise to clear overhanging parts of the harvester.

14. In combination with the jointed arms and beaters of a harvester-reel, a cam in their pathway to move the beaters longitudinally as they rise in order to clear overhanging parts of the harvester.

15. In combination with the overhanging grain-table of a harvester, a reel having jointed arms and beaters, and mechanism whereby said beaters are given a longitudinal movement as they rise to clear the table.

16. In combination with the overhanging grain-table of a harvester, a reel having jointed arms and beaters, and a cam in their path, whereby the beaters are swung longitudinally as they rise to clear the table.

17. The combination of the reel-shaft, the reel-arms jointed thereto, the reel-beaters jointed to said arms, and lugs on the arms adapted to ride over a cam as the reel revolves to move the beaters lengthwise.

18. The combination of the reel-shaft, the reel-arms jointed thereto, the reel-beaters jointed to said arms, lugs upon the arms adapted to ride over a cam as the reel revolves to move the beaters lengthwise, and springs acting against the face of the cam to return the arms and beaters to their normal position as they leave it.

CHAS. COLAHAN.

Witnesses:
JNO. H. WHIPPLE,
J. W. MERRIAM.